US006577875B1

(12) United States Patent
Brouwer (10) Patent No.: US 6,577,875 B1
(45) Date of Patent: Jun. 10, 2003

(54) CELLULAR COMMUNICATIONS SYSTEM/ METHOD WITH UPLINK INTERFERENCE CEILING

(75) Inventor: Frank Brouwer, Ga Enschede (NL)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/551,836

(22) Filed: Apr. 18, 2000

(51) Int. Cl.[7] .............................. H04B 7/00; H04Q 7/20
(52) U.S. Cl. ...................... 455/522; 455/522; 455/63; 455/513; 370/317; 370/318
(58) Field of Search ................... 370/317, 318; 455/63, 67.3, 513, 522

(56) References Cited

U.S. PATENT DOCUMENTS

| 5,245,629 | A |   | 9/1993  | Hall ............................ 375/1 |
| 5,267,262 | A | * | 11/1993 | Wheatley, III ............. 340/7.33 |
| 5,305,468 | A | * | 4/1994  | Bruckert et al. ........... 340/7.41 |
| 5,423,081 | A |   | 6/1995  | Thiele et al. ............... 455/116 |
| 5,603,092 | A | * | 2/1997  | Stjernholm ................. 455/423 |
| 5,604,730 | A | * | 2/1997  | Tiedemann, Jr. ........... 370/252 |
| 5,812,938 | A | * | 9/1998  | Gilhousen et al. .......... 455/517 |
| 5,828,948 | A |   | 10/1998 | Almgren et al. ........... 455/34.1 |
| 5,832,368 | A |   | 11/1998 | Nakano et al. .............. 455/63 |
| 5,893,036 | A |   | 4/1999  | Trandai et al. ............. 455/522 |
| 5,963,865 | A |   | 10/1999 | Desgagné et al. .......... 455/450 |
| 5,987,333 | A |   | 11/1999 | Sole .......................... 455/522 |
| 6,032,026 | A |   | 2/2000  | Seki et al. ................... 455/63 |
| 6,034,952 | A |   | 3/2000  | Dohi et al. ................. 370/335 |
| 6,118,767 | A | * | 9/2000  | Shen et al. ................. 370/252 |
| 6,151,508 | A | * | 11/2000 | Kim et al. ................. 455/13.4 |
| 6,163,707 | A | * | 12/2000 | Miller ........................ 455/115 |
| 6,212,364 | B1 | * | 4/2001  | Park ........................... 455/522 |
| 6,259,928 | B1 | * | 7/2001  | Vembu ....................... 455/522 |
| 6,285,887 | B1 | * | 9/2001  | Mimura ..................... 370/331 |
| 6,292,471 | B1 | * | 9/2001  | Cao et al. ................... 370/252 |
| 6,347,083 | B1 | * | 2/2002  | Nishino ..................... 370/342 |

FOREIGN PATENT DOCUMENTS

| EP | 0 762 668 A2 | 3/1997 |
| EP | 0 869 626 A1 | 10/1998 |
| WO | WO 00/38348 | 6/2000 |

OTHER PUBLICATIONS

Standard Search Report dated Oct. 18, 2001 (EPO Search Report).

* cited by examiner

Primary Examiner—Thanh Cong Le
Assistant Examiner—Stephen D'Agosta
(74) Attorney, Agent, or Firm—Nixon & Vanderhye P.C.

(57) ABSTRACT

In response to determining that the total uplink (UL) interference in a cell has exceeded a predetermined threshold or value, a base station (BS) instructs a plurality of the mobile stations (MS) currently operating in the cell to reduce their current UL power by a predetermined amount (e.g., value of dB or percentage). Such instruction may override conventional closed loop PC instructions to the mobiles in certain embodiments. In such a manner, the UL power reduction is shared in a fairly equal manner by all mobile stations in the cell and overload can be reduced and/or avoided. Subsequently, mobiles stations moving away from the BS toward the cell border may be permitted to increase their UL power so as to maintain a connection. In certain embodiments, the invention is utilized in the context of a code division multiple access (CDMA) system.

14 Claims, 5 Drawing Sheets

CELLULAR COMMUNICATIONS SYSTEM/METHOD WITH UPLINK INTERFERENCE CEILING

FIELD OF THE INVENTION

The present invention relates to a system and corresponding method for controlling mobile station (MS) uplink power as a function of uplink interference in a particular cell defined by a base station(s).

BACKGROUND OF THE INVENTION

In cellular communications systems, service areas are formed by small zones known as "cells." Each cell is defined by a particular base station (BS), so that it is possible to achieve effects of a transmission power reduction with an increase in subscriber capacity. One type of radio access scheme which has become increasingly popular over the last several years is known as code division multiple access (CDMA). In a CDMA system, since the same frequency band is shared by multiple users, signals of other users become interference signals which may degrade the communication quality of a particular user. When a base station (BS) communicates with near and remote mobile stations (MS) at the same time, it receives the transmitted signal from the near mobile station at a high level, whereas from the remote mobile station at a much lower level. Thus, communications between the base station and the remote MS present a problem in that the channel quality is sharply degraded by interference from the near MS. This is typically referred to as the near-far problem.

One technique which has been used for solving the near-far problem is controlling transmission power such that the received power of a receiving station, or the SIR (signal to interference plus noise power ratio) thereof, is kept fixed regardless of the location of a MS. This provides more consistent channel quality across a given service area. In other words, in CDMA systems the output power of mobile stations is often controlled, with the goal of transmitting at a power such that the received signal quality at the BS is just sufficient for the desired quality of reception. Such control depends upon the conditions of the signal at issue and upon interference (i.e., interfering signals).

In this regard, a closed loop transmission power control system for CDMA is known which employs transmission power control bits. In this system, when a MS within a cell communicates with the base station (BS) in that cell, it measures the received SIR of the desired wave from the BS, and determines the transmission power control bits for controlling the transmission power of the BS in accordance with the measured results. Subsequently, the MS inserts the transmission power control bits into its transmitted signal and transmits them to the BS. Receiving the signal transmitted from the MS, the BS extracts the transmission power control bits therefrom and determines the BS transmission power in accordance with the command of the transmission power control bits.

Still further, the BS measures the received SIR of the wave received from the MS and determines the transmission power control bits for controlling the transmission power (i.e., uplink power) of the MS on the basis of these measurement results. Then, the BS inserts the transmission power control (PC) bits into the transmitted signal, which is transmitted to the MS. Receiving the signal from the BS, the MS extracts the transmission power control (PC) bits and determines the transmission power (i.e., uplink power) in accordance with the instructions of the transmission power control (PC) bits. The closed loop thus formed between the MS and the BS enables each of the MS and BS to control its transmission power.

Unfortunately, the amount of interference in a particular cell increases along with an increase in the number of mobile stations being used in that cell. When a signal is added in the cell, all mobiles stations will typically want to increase their uplink or transmit power until the quality of the signal received at the BS is again sufficient. Such a system can operate in a satisfactory manner so long as the sum of all signals in the cell is below a critical or predetermined value. When it goes above or over this value, all users or mobile stations will constantly increase their power; this is sometimes called the "party effect." When this occurs, one or more signals are typically removed (i.e., certain MS connections are terminated) until most of the users reduce their power to levels such that the sum in the cell is below the critical value. During this time of overload, control is speculative at best.

It is undesirable to react to overload by immediately cutting of certain MS connections. Alternatively, if one attempts to solve the aforesaid overload or party effect problem by increasing the uplink power from each MS, the result is increased interference in the cell at issue as well as in other cells. This is also undesirable. Moreover, when measures are taken to solve the overload problem, it often takes quite a bit of time for the system to again reach normal operation.

It would also be undesirable to set a concrete limit on the UL power which may be utilized by mobile stations once the critical value of UL interference has been reached, for at least the following reasons. Assume that mobile stations A, B, and C are operating in a particular cell. The base station detects UL interference having exceeded the threshold or critical value. Assume that the base station in turn instructs these three mobile stations that they cannot increase their UL power. Problems occur when one of these mobile stations (e.g., MS A) travels further from the base station and towards the cell border. Because it is further from the BS and closer to the border, it requires additional UL power. However, if a limit has been placed on it, it is not allowed to increase power (even if such an increase would not undesirably increase the UL interference in the cell due to the MS' distance from the BS). Thus, while placing concrete UL power limits on mobile stations may be able to reduce total UL interference in a particular cell, certain mobile stations in the cell may be undesirably handicapped or accidentally cut off as a result of the same (e.g., when certain mobile stations travel away from the BS and toward the cell border).

In view of the above, it will be apparent to those skilled in the art that there exists a need for addressing UL interference problems in cells of cellular communication networks. Moreover, there exists a need for addressing such problems without having to cut off or undesirably handicap certain MS units which happen to be moving toward the cell border.

SUMMARY OF THE INVENTION

In response to calculating or detecting that the uplink (UL) interference has exceeded a predetermined threshold or value in a cell which utilizes closed loop uplink (UL) power control (PC), a base station (BS) instructs a plurality of the mobile stations (MS) currently operating in the cell to reduce their current UL power by a predetermined amount (e.g., value of dB or percentage). Such instruction may override conventional closed loop PC instruction to the mobiles in certain embodiments. In certain embodiments, the base station instructs all mobile stations currently operating in the cell to do so. In such a manner, the UL power reduction is shared in a fairly equal manner by all mobile stations in the cell and adverse effects of overload can be reduced and/or avoided.

As certain mobile stations in the cell move away from the BS and toward the cell border, they may request additional UL power. The base station permits them to increase their UL power, preferably so long as the total UL interference does not increase as a result of the same at the BS. Thus, MS units which happen to be moving toward the cell border are not unduly handicapped relative to other MS units in the cell when a UL interference threshold has been exceeded.

In short, the power of individual mobile stations is not limited (i.e., a concrete limit or ceiling is not put on the UL power of each cell). It is not the output power by the mobiles which is of interest, but instead the received UL interference at the BS which is determinative of total UL interference. The "pain" or burden is thus shared in a fairly uniform manner by all mobile stations in the cell. It is not necessary to immediately terminate connections of certain mobile stations in the cell (although this may be done in certain embodiments along with the above UL power reduction instructions). By limiting the UL interference in the cell, all mobile stations suffer a little, but most if not all still have sufficient quality to continue communicating with the BS.

BRIEF DESCRIPTION OF THE DRAWINGS

The foregoing and other objects, features, and advantages of the invention will be apparent from the following description of preferred example embodiments as well as illustrated in the accompanying drawings in which reference numerals refer to like parts. While individual functional blocks and components are shown in many of the figures, those skilled in the art will appreciate that these functions may be performed by individual hardware circuits, by a suitably programmed digital microprocessor or general purpose computer, by an application specific integrated circuit (ASIC) and/or by one or more digital signaling processes (DSPs).

DETAILED DESCRIPTION OF THE DRAWINGS

In the following description, for purposes of explanation and not limitation, specific details are set forth, such as particular embodiments, network architectures, signaling flows, protocols, techniques, etc. in order to provide an understanding of the present invention. However, it will be apparent to one skilled in the art that the present invention may be practiced in other embodiments that depart from these specific details. For example, although the present invention is disclosed in the example context of a mobile radio CDMA communication system, it may also be employed in other types of closed loop power control communications systems such as TDMA, and the like. In certain instances, detailed descriptions of well-known methods, interfaces, devices, protocols, and signaling techniques are omitted so as not to obscure the description of the present invention with unnecessary detail.

Figure 1:
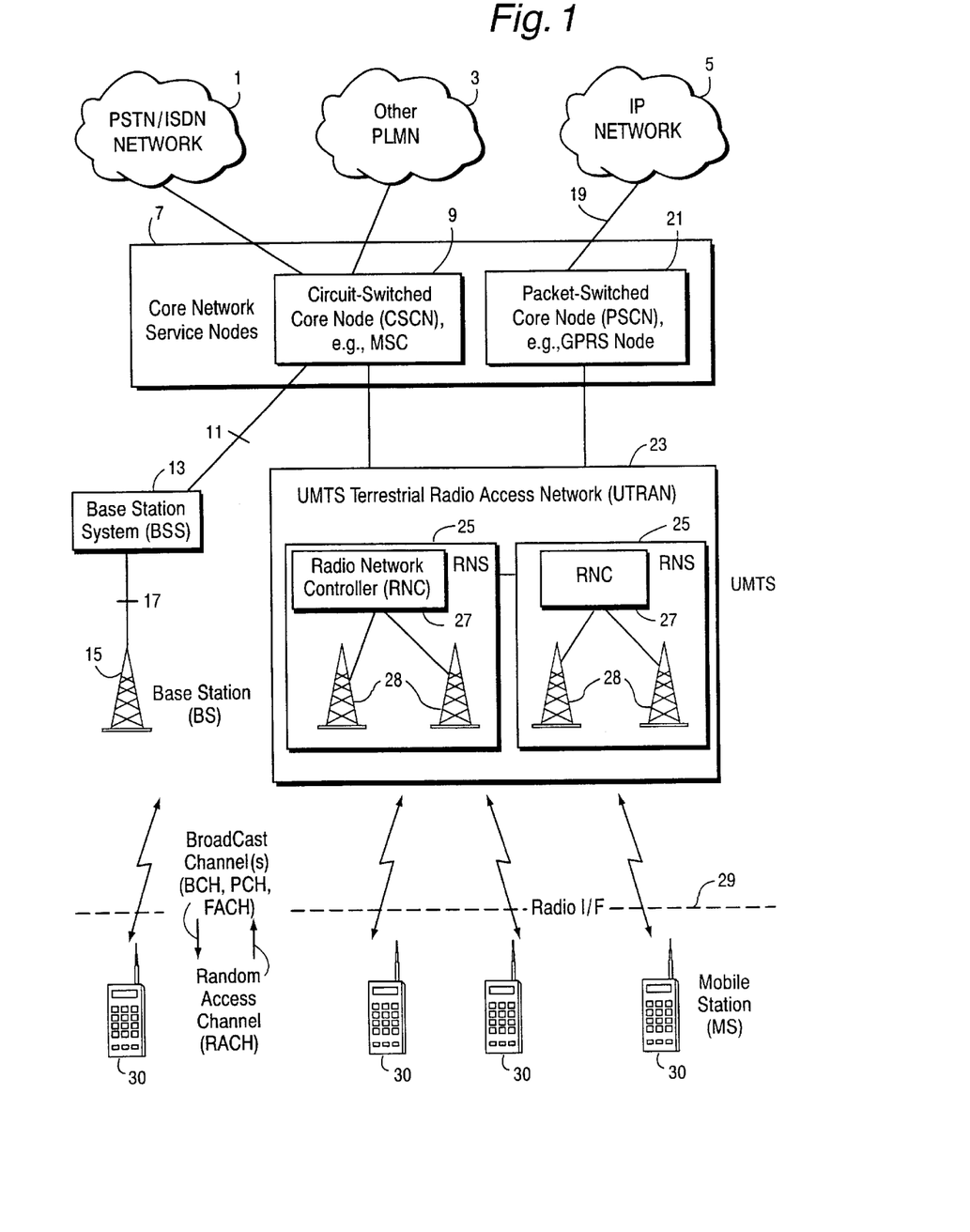
FIG. 1 is a function block diagram illustrating a universal mobile telephone system (UMTS) in which the present invention may be employed.

FIG. 1 illustrates an exemplary context of a universal mobile telecommunications system (UMTS) in which the instant invention may be implemented. A representative, circuit switched, external core network 1 may be, for example, the public switched telephone network (PSTN) and/or the integrated services digital network (ISDN). Another circuit switched, external core, network may correspond to another public land mobile radio network (PLMN) 3. A representative, packet switched, external core network 5 may be, for example, an IP network such as the Internet. The core network(s) are coupled to corresponding network service nodes 7. The PSTN/ISDN network 1 and other PLMN networks 3 are connected to a circuit switched core node (CSCN) 9, such as a mobile switching center (MSC), that provides circuit switched services. The UMTS may coexist with an existing cellular network, such as the global system for mobile communication (GSM), where the MSC 9 is connected over an interface 11 to a base station subsystem 13 which in turn is connected to radio base station 15 over an interface 17.

The packet switched network 5 is connected over interface 19 to a packet switched core node (PSCN), e.g., a general packet radio service (GPRS) node 21 tailored to provide packet switched type services in the context of GSM which is sometimes referred to as the serving GPRS service node (SGSN). Each of these core network service nodes 9 and 21 also connects to the UMTS terrestrial radio access network (UTRAN) 23 over a radio access network interface. The UTRAN 23 includes one or more radio network systems (RNS) 25 each with a radio network controller (RNC) 27 coupled to a plurality of base stations (BS) 28 and to other RNCs in the UTRAN 23.

Preferably, radio access over radio interface 29 is based upon wideband code division multiple access (WCDMA) with individual radio channels allocated using CDMA channelization or spreading codes. Of course, other access methods may be employed, such as TDMA or any other type of CDMA. WCMDA provides wide bandwidth and other high transmission rate demands as well as robust features like diversity handoff to ensure high quality communication service in frequently changing environments. Each mobile station (MS) 30 is assigned its own scrambling code in order for a base station 15, 28 to identify transmissions from that particular mobile station 30. Each mobile station 30 also uses its own scrambling code to identify transmissions from base stations either on a general broadcast or common channel or transmission specifically intended for that MS 30.

Figure 2:
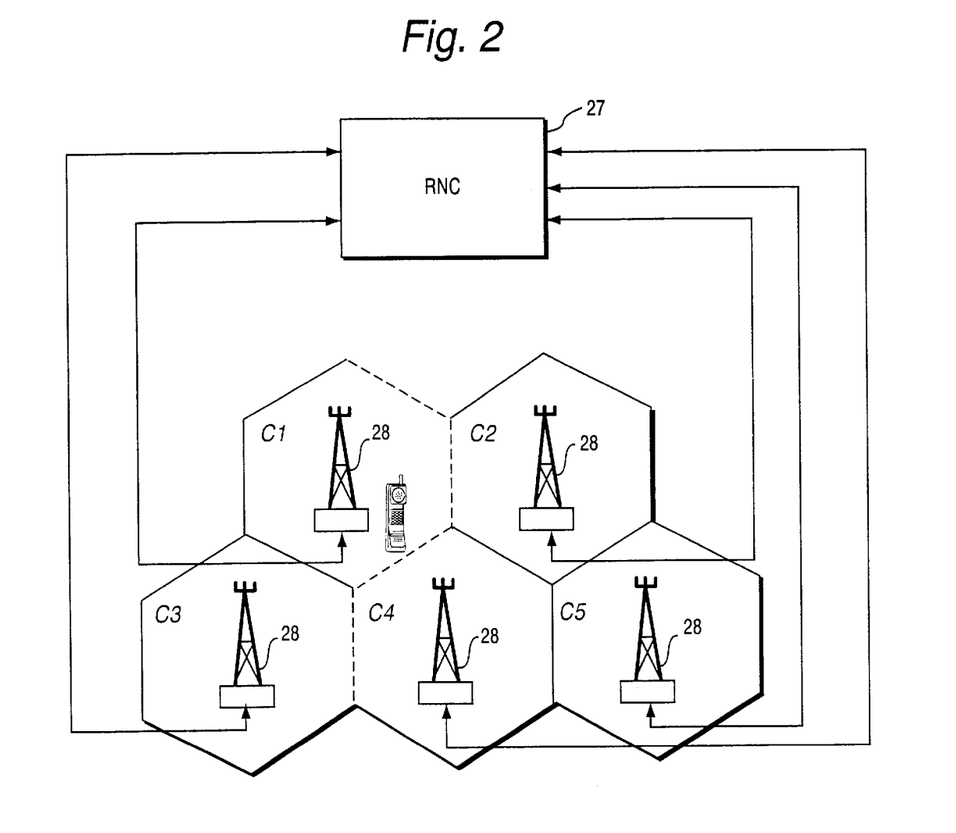
FIG. 2 illustrates each base station (BS) of the FIG. 1 embodiment defining its own cell (each BS may define several cells in certain alternative embodiments).

Referring to FIG. 2, radio transmissions of each base station 28 cover a geographical area known as a "cell." Thus, each base station 15, 28 defines a cell having one or more sectors. Cells C1–C5 are illustrated in FIG. 2, along with the corresponding five base stations 28. As discussed above, a plurality of different mobile stations 30 may be provided in each cell. Each BS is in communication with a corresponding RNC 27.

Figure 3A:
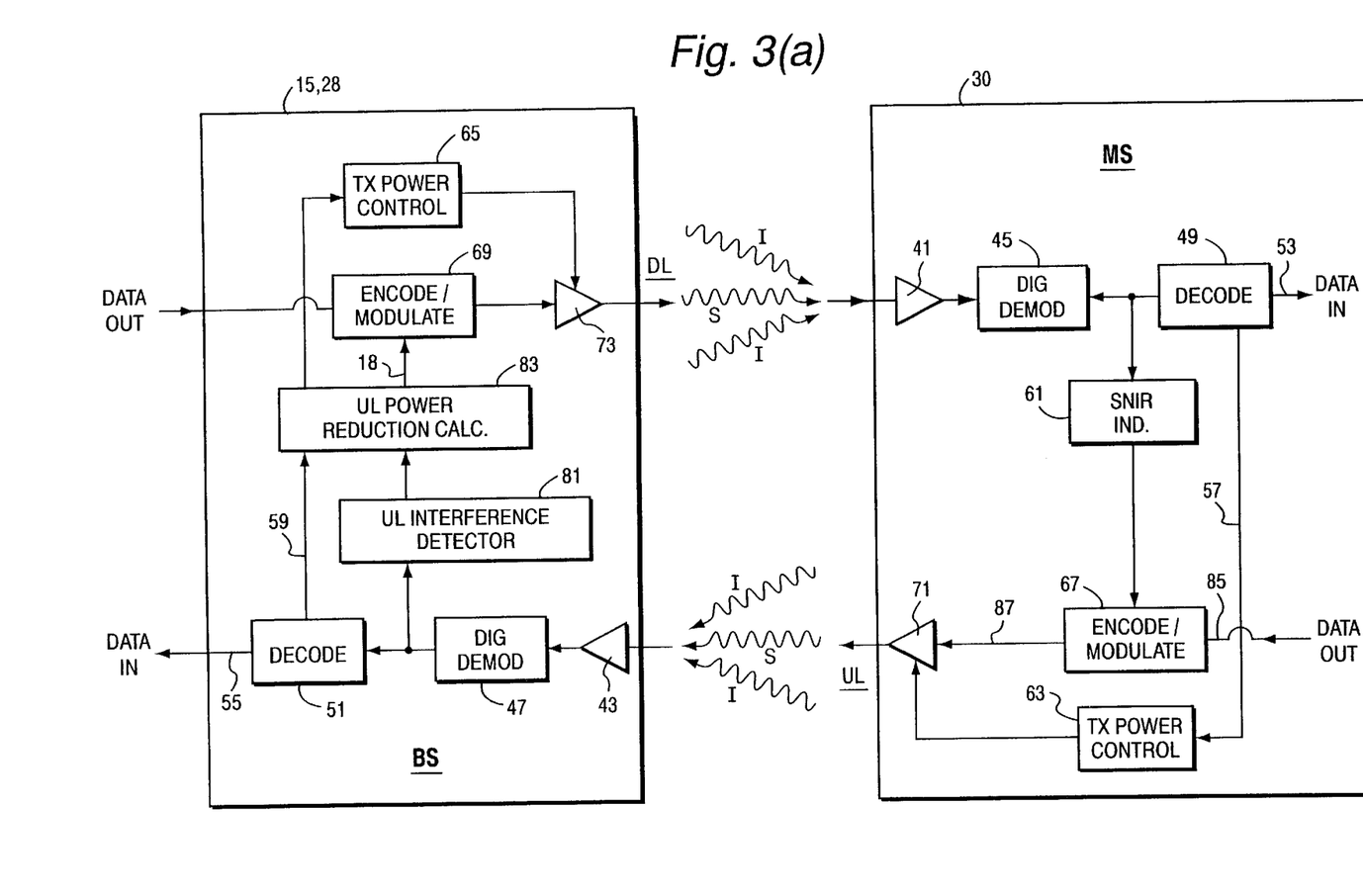
FIG. 3(a) is a function block diagram illustrating a base station in communication with a particular mobile station according to an embodiment of this invention.

FIG. 3(a) illustrates an embodiment of this invention in the context of a closed loop uplink (UL) power control (PC)

system utilized in the context of a CDMA cellular telecommunications system. Referring to FIG. 3(a), communication between a mobile station (MS) 30 and a base station (BS) 15, 28 within a digital cellular communications system as shown in FIGS. 1–2 is indicated in both directions, i.e., both uplink (UL) and downlink (DL). These communications are illustrated with desired message signals (S) as well as interference (I) components. Each of the base stations and mobile stations in FIGS. 1–2 has similar components relative to those shown in FIG. 3(a).

Still referring to FIG. 3(a), illustrated are signal receiving amplifiers 41 and 43 which feed corresponding digital demodulators 45 and 47, respectively. The digital demodulators 45 and 47 are connected separately to respective decoders 49 and 51 for recovering message data (on 53 and 55, respectively) and transmit power control bits/data (on 57 and 59, respectively). Demodulator 45 in MS 30 is also connected to SNIR indicating circuitry 61 which functions to produce a useable indication of SNIR at the MS. Typically, SNIR indications are provided on a frame by frame basis for received DL signals at MS 30. Also illustrated are respective transmission power controllers 63 and 65, respective encoding and modulating circuitry 67 and 69 operative on control data and/or message data to be transmitted by way of respective variable amplifiers 71 and 73. The output power levels from the respective mobile station 30 and base station 15, 28 are controlled by transmit power controllers 63 and 65, respectively.

To summarize, the closed loop power control system illustrated in FIG. 3(a) works as follows. A transmitter (either in the BS or MS, but assume the transmitter in the MS in this embodiment) formats a signal to be transmitted in a way suitable for the applicable transmission interface encoder/modulator 67. The signal is amplified at 71, and then transmitted as an UL signal to the BS. The receiver (i.e., the BS in this embodiment) demodulates 47 and decodes 51 the received signal. The quality of the decoded signal is observed at 83 and/or 65 by a power control (PC) function. When the signal quality is lower than desired (i.e., lower than a predetermined threshold), power controller 65 outputs an "up" command which is input to amplifier 73 and returned to the MS via a DL signal. Otherwise, a "down" command may be returned if it is desired that the MS lower its UL power. The MS receives the up/down command or instruction and demodulates 45 and/or decodes 49 the same. The MS then adjusts its UL power accordingly following the command/instruction sent by the BS. The DL power control may be controlled in a similar manner.

In accordance with an embodiment of this invention, UL interference detector 81 in the base station determines (e.g., monitors, detects, estimates, and/or calculates) the total UL interference in the cell defined by the base station. Detector 81 may do this, for example, by monitoring the total UL power in the cell or alternatively by monitoring the quality of received signals. Detector 81 determines the total interference received from all mobile stations 30 operating in the cell at a given time. In certain preferred embodiments of this invention, total uplink interference may be calculated and/or detected by detector 81 in accordance with the UTRA carrier RSSI Section 5.1.5 of the December, 1999 Technical Specification 3G TS 25.215, which is published, for example, at www.3gpp.org, the disclosure of which is hereby incorporated herein by reference. Alternatively, the total uplink interference may be detected in accordance with any of the systems and/or methods disclosed in, for example, any of U.S. Pat. Nos. 6,032,026, 5,963,865, or 6,034,952, the disclosures of which are all hereby incorporated herein by reference. Uplink interference detector 81 in the base station is in communication with UL power reduction calculating circuit 83. Circuit 83 determines whether or not to instruct mobile stations in the cell to reduce uplink power and/or the degree to which the uplink power should be reduced.

So long as the UL power remains below a predetermined threshold or critical value, detector 81 allows the normal closed loop power control process described above to control respective the UL powers utilized by the individual MS connections. However, when detector 81 determines (e.g., measures or estimates) a total interference over the predetermined threshold, it instructs power reduction function 83 accordingly which in turn causes a "down" command/ instruction to be sent via amplifier 73 to the MS. Preferably, "down" commands/instructions from detector 81 and/or function 83 override decisions made by power controller 65 once the UL power or interference has been determined to be too high. Thus, during an overload situation, the UL power of the mobile stations 30 is limited, which in turn also limits interference to other cells. Moreover, when such measures are taken to address overload situations, the time needed to get back to normal operating conditions may be reduced. In an exemplary embodiment of this invention, the UL total interference threshold may be from about 6–10 dB over the thermal noise floor, or e.g., about –100 dB.

Figure 3B:
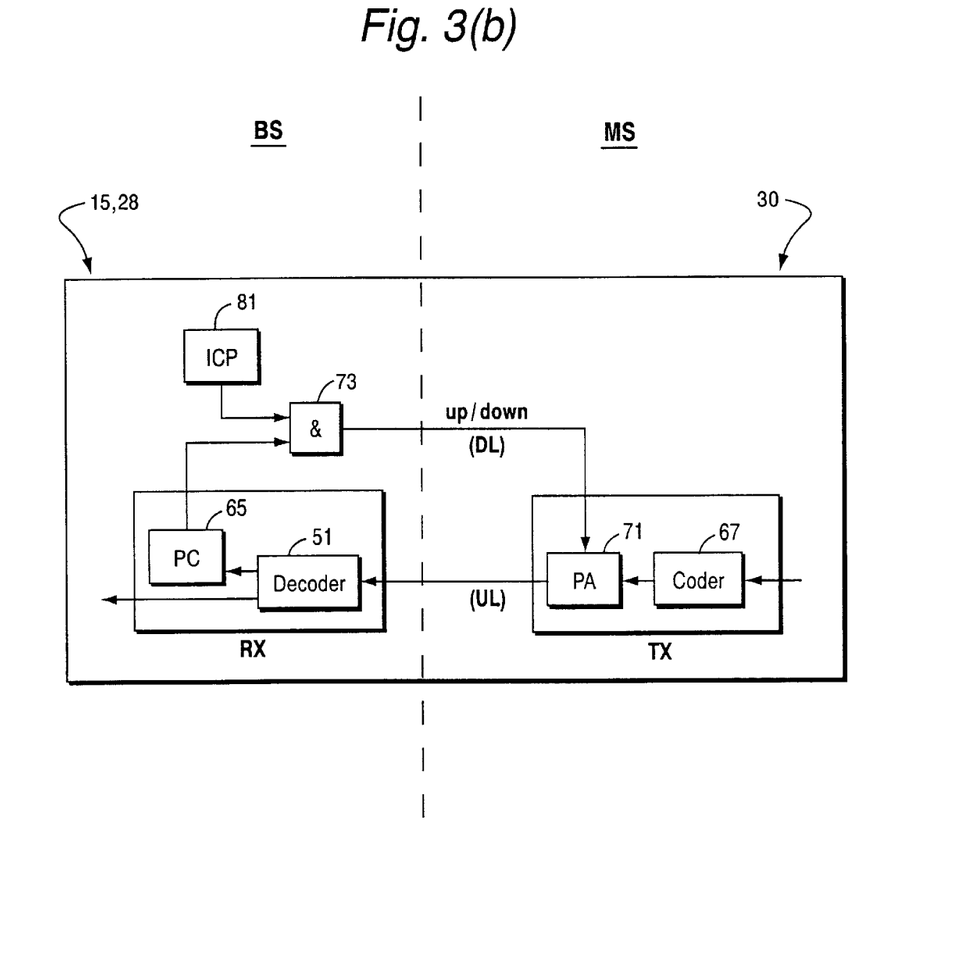
FIG. 3(b) is a function block diagram illustrating a base station in communication with a particular mobile station according to another embodiment of this invention.

FIG. 3(b) illustrates another embodiment of this invention, which is similar to the FIG. 3(a) embodiment in that included are MS 30, BS 15, 28, UL amplifier 71, downlink amplifier/summer 73, power controller 65 at the BS, and coders 51, 67. Thus, a closed loop power control system is also provided in this embodiment. Here, interference ceiling protection (ICP) unit 81 (i.e., UL interference or power detector) continuously monitors the total UL power or interference, as does unit 81 in the FIG. 3(a) embodiment. When ICP 81 determines (e.g., measures or estimates) a total interference over the predetermined threshold, it outputs a "down" command/instruction to be sent via amplifier 73 to the MS. Preferably, "down" commands/instructions from ICP 81 override decisions made by power controller 65 once the UL power or interference has been determined to be too high.

Figure 4:
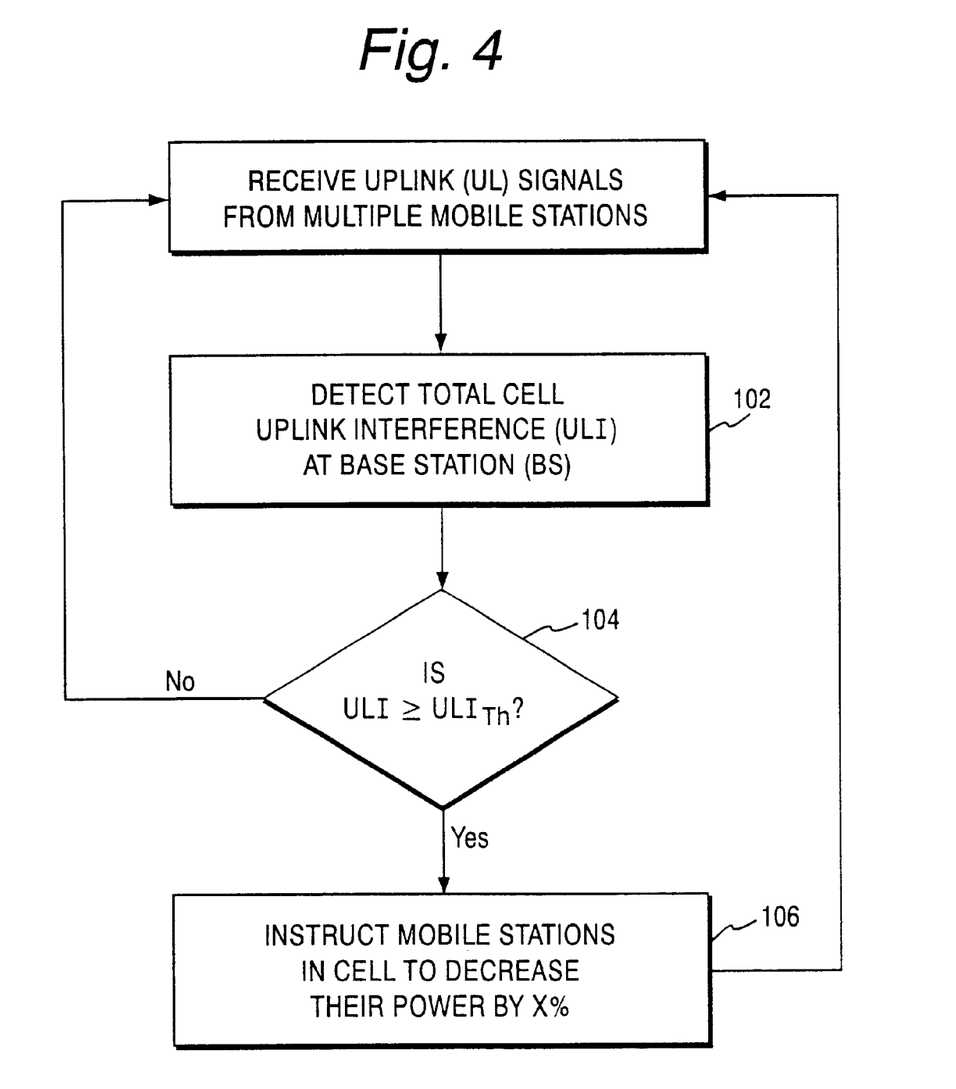
FIG. 4 is a flow chart illustrating steps taken according to an embodiment of this invention.

Referring to FIGS. 3–4, an exemplary operation of a non-limiting embodiment of this invention will now be described.

A user of MS 30 inputs data into the unit (e.g., the "data out" 85 in FIG. 3(a) may be spoken audio data or any other type of data desired to be transmitted when the MS is a cell phone or the like). This data is then encoded and modulated at 67 in accordance with e.g., CDMA techniques. The resulting modulated signal 87 is then amplified at 71 under the direction of transmission power controller 63. The wireless uplink (UL) signal is then transmitted to the base station 15, 28. At the base station, the signal is received by amplifier 43, demodulated at 47 and decoded at 51 in accordance with known CDMA techniques. A portion of the received signal is also forwarded to uplink interference or power detector 81, which in turn determines the total UL interference in the cell(s) defined by the base station (see step 102 in FIG. 4). Detector or ICP 81 takes into account all mobile stations 30 currently operating in the cell in making its detection/calculation. Once detector/ICP 81 has determined the total UL interference/power in the cell, either the ICP itself or the UL power reduction calculation circuit 83 determines whether or not the total UL interference in the cell exceeds (or alternatively is at least as great as) a predetermined uplink interference threshold $ULI_{th}$ (see step 104 in FIG. 4). This may be determined may comparing the determined UL total power with a predetermined power threshold or level.

As illustrated in FIG. 4, if circuit 83 (or ICP 81 in the FIG. 3(b) embodiment) determines that the total uplink interference at this point in time does not exceed the threshold, then the normal closed loop UL power control process continues with respective "up" and/or "down" commands/instructions being sent to the MS. On the other hand, if it is determined at step 104 that the uplink interference total in the cell does exceed the threshold, then the base station instructs all mobile stations 30 currently operating in the cell to decrease their uplink power by either a predetermined amount (e.g., all mobile stations in the cell may be instructed to reduced their respective UL powers by 1 db, or alternatively by some percentage) or alternatively an amount determined as a function of how much the total UL interference in the cell has exceeded the threshold (see step 106 in FIG. 4). In this regard, the information for instructing the mobile stations 30 in the cell to decrease their respective UL powers, is encoded, modulated and amplified, and sent to the different mobiles stations in the cell (i.e., "down" instructions/ commands are sent on the DL to all MSs in the cell). The signals are received by the MS and digitally demodulated and decoded in accordance with known CDMA techniques. Power controllers 63 in the different mobile stations 30 then adjust amplifier 71 in a manner such that the uplink power at each mobile station is reduced in accordance with the received "down" instructions.

In the case where a particular MS 30 which has reduced its UL power in accordance with received instructions and thereafter proceeds to move away from the base station and toward the cell border, the MS may request the base station to allow the MS to increase its UL power in order to maintain a current satisfactory quality of communication. In accordance with certain embodiments of this invention, the BS will permit the MS 30 to increase its UL power as it moves away from the base station and toward the cell border (even when the threshold has been and still is exceeded), so long as the increase in UL power does not cause the total power received at the BS to increase as the MS at issue moves away from the base station. This illustrates that there is no concrete limit placed upon UL power which may be used by any MS in the cell, even when the threshold UL interference level has been exceeded. Thus, in accordance with certain embodiments of this invention, all mobile stations 30 operating in the cell share the burden in an approximately equal manner. Mobile stations 30 which happen to be moving away from the base station and toward the cell border are not unfairly handicapped and/or terminated.

While the present invention has been described in terms of a particular embodiment, those skilled in the art will recognize that the present invention is not limited to the specific example embodiments described and illustrated herein. Different formats, embodiments, and adaptations besides those shown and described as well as many modifications, variations, and equivalent arrangements may also be used to implement the invention. Accordingly, it is intended that the invention be limited only by the scope of the claims appended hereto.

What is claimed is:

1. A method of limiting uplink interference in a cell of a cellular communications network, the method comprising the steps of:
   providing a base station which defines a cell;
   providing a plurality of mobile stations operating in the cell;
   determining total uplink interference in the cell;
   determining whether the total uplink interference in the cell exceeds a predetermined threshold;
   when it is determined that the total uplink interference in the cell exceeds the predetermined threshold, instructing mobile stations operating in the cell to reduce their uplink power; and
   wherein a concrete UL power limit is not set for any mobile station (MS) in the cell when the threshold has been exceeded.

2. The method of claim 1, wherein said instructing step comprises instructing all mobile stations currently operating in the cell to reduce their uplink power.

3. The method of claim 1, wherein said instructing step comprises instructing the mobile stations to reduce their uplink power by a predetermined amount.

4. The method of claim 1, wherein said instructing step comprises instructing the mobile stations to reduce their uplink power by a percentage.

5. The method of claim 1, further comprising the step of determining how much to instruct the mobile stations to reduce uplink power as a function of how much the determined total uplink interference in the cell exceeds the threshold.

6. The method of claim 1, wherein the method is performed in a CDMA based system, and said determining total interference step comprises measuring or estimating the total uplink power received at the base station.

7. The method of claim 1, further comprising the step of instructing a MS in the cell to increase its UL power as the MS moves geographically away from the base station.

8. The method of claim 1, further comprising the steps of permitting mobiles stations in the cell to increase their respective UL powers as they move toward a border of the cell provided that the total power received at the base station does not increase.

9. A method of limiting interference in a CDMA communications system including a receiver and a plurality of transmitters, the method comprising:
   determining total uplink interference received at the receiver based upon a total power received by the receiver via CDMA signals received from the plurality of transmitters;
   determining whether the total uplink interference exceeds a predetermined threshold;
   when it is determined that the total uplink interference received at the receiver exceeds the predetermined threshold, instructing the plurality of transmitters via CDMA signals to reduce uplink power; and
   instructing at least one of the transmitters to increase its UL power as the transmitter moves geographically away from the receiver, even when the threshold has been exceeded.

10. The method of claim 9, wherein the receiver is a base station in a cellular communications network, and the transmitters comprise mobile stations in a cell defined by the base station.

11. The method of claim 9, further comprising the step of determining how much to instruct the transmitters to reduce uplink power as a function of how much the determined total uplink interference at the receiver exceeds the threshold.

12. The method of claim 9, wherein said determining total interference step comprises measuring total uplink power received at the receiver from the transmitters.

13. A CDMA based communications system comprising:
   a base station defining a cell;

a plurality of mobile stations operating in the cell, each of the mobiles station being in communication with the base station via CDMA uplink and downlink signals, wherein uplink signals are sent from respective mobile stations in the cell to the base station;

a closed loop uplink power control system including a circuit for monitoring quality of signals received from respective mobile stations, the closed loop uplink power control system instructing respective mobile stations in the cell to reduce or increase their respective uplink powers based upon the quality of signals received from the respective mobile stations;

said base station including total uplink interference circuitry for determining total uplink interference in the cell and determining whether the total uplink interference in the cell exceeds a predetermined threshold;

said total uplink interference circuitry, when it is determined that the total uplink interference in the cell exceeds the predetermined threshold, instructing mobile stations operating in the cell to reduce their uplink power; and wherein a concrete UL power limit is not set for a mobile station (MS) in the cell when the threshold has been exceeded.

14. The system of claim 13, wherein instructions from said total uplink interference circuitry override signals from said closed loop power control system.

\* \* \* \* \*